(12) United States Patent
Leng et al.

(10) Patent No.: US 6,339,663 B1
(45) Date of Patent: Jan. 15, 2002

(54) BIDIRECTIONAL WDM OPTICAL COMMUNICATION SYSTEM WITH BIDIRECTIONAL OPTICAL SERVICE CHANNELS

(75) Inventors: Yongzhang Leng, Damascus; John Lynn Shanton, III, Middleton, both of MD (US)

(73) Assignee: Seneca Networks, Inc., Rockville, MD (US)

( * ) Notice: Subject to any disclaimer, the term of this patent is extended or adjusted under 35 U.S.C. 154(b) by 0 days.

(21) Appl. No.: 09/742,220

(22) Filed: Dec. 22, 2000

(51) Int. Cl.[7] .............................. G02B 6/28; H04J 14/02
(52) U.S. Cl. ......................... 385/24; 385/37; 359/124; 359/127; 359/130; 359/341
(58) Field of Search ..................... 385/24, 37; 359/341, 359/124, 127, 130

(56) References Cited

U.S. PATENT DOCUMENTS

| | | | |
|---|---|---|---|
| 5,532,864 A | 7/1996 | Alexander et al. | 359/177 |
| 5,633,741 A | 5/1997 | Giles | 359/124 |
| 5,663,820 A | 9/1997 | Shiragaki | 359/128 |
| 5,748,350 A | 5/1998 | Pan et al. | 359/130 |
| 5,748,363 A | 5/1998 | Duck et al. | 359/341 |
| 5,774,245 A | 6/1998 | Baker | 359/128 |
| 5,812,306 A * | 9/1998 | Mizrahi | 359/341 |
| 5,909,295 A | 6/1999 | Li et al. | 359/130 |
| 5,959,749 A | 9/1999 | Danagher et al. | 359/124 |
| 5,995,259 A | 11/1999 | Meli et al. | 359/134 |
| 6,002,503 A | 12/1999 | Mizrahi | 359/124 |
| 6,038,047 A | 3/2000 | Nava et al. | 359/154 |
| 6,041,152 A | 3/2000 | Clark | 385/24 |
| 6,061,484 A | 5/2000 | Jones et al. | 385/24 |
| 6,111,675 A | 8/2000 | Mao et al. | 359/124 |
| 6,130,765 A | 10/2000 | Gautheron et al. | 359/127 |
| 6,160,660 A * | 12/2000 | Aina et al. | 359/341 |
| 6,236,499 B1 * | 5/2001 | Berg et al. | 359/341 |
| 6,243,177 B1 * | 6/2001 | Duerksen | 359/127 |

* cited by examiner

Primary Examiner—Hemang Sanghavi
(74) Attorney, Agent, or Firm—Margaret A. Burke

(57) ABSTRACT

The present invention provides a bidirectional wavelength division multiplexed optical communication system having bidirectional optical service channels. The bidirectional WDM optical communication system includes a bidirectional optical waveguide configured to carry a bidirectional optical communication signal comprising counterpropagating WDM optical signals. Each WDM optical signal includes plural optical channels and an optical service channel. A bidirectional optical add-drop multiplexer optically communicates with the waveguide. A first optical service channel selector optically communicates with the first bidirectional optical add-drop multiplexer input/output port. The first optical service channel selector is configured to separate the first optical service channel from the first WDM optical communication signal such that the first WDM signal enters the first input/output port of the bidirectional optical add-drop multiplexer and the first optical service channel is routed to a service channel module. Similarly, a second optical service channel selector optically communicates with the second input/output port of the bidirectional optical add-drop multiplexer and routes the second optical service channel to a service channel module. The bidirectional WDM optical communication system may advantageously by deployed in metropolitan networks requiring high volumes of add-drop multiplexing.

5 Claims, 4 Drawing Sheets

BIDIRECTIONAL WDM OPTICAL COMMUNICATION SYSTEM WITH BIDIRECTIONAL OPTICAL SERVICE CHANNELS

BACKGROUND OF THE INVENTION

1. Field of the Invention

The invention relates to wavelength division multiplexed optical systems in general and, more particularly, to bidirectional wavelength division multiplexed optical communication systems having a bidirectional waveguide configured to carry two counterpropagating WDM optical communication signals and at least two counterpropagating optical service channels.

2. Description of the Related Art

As the need for communication signal bandwidth increases, wavelength division multiplexing (WDM) has progressively gained popularity for multiplying the transmission capacity of a single optical fiber. A review of optical networks, including WDM networks, can be found in Ramaswami et al., *Optical Networks: A Practical Perspective* (Morgan Kaufman,© 1998), the disclosure of which is incorporated herein by reference. Typically, wavelength division multiplexed optical communication systems have been designed and deployed in the long-haul, interexchange carrier realm. In these long-haul optical systems, a wavelength division multiplexed optical communication signal comprising plural optical channels at different wavelengths travels in a single direction on a single fiber (unidirectional transmission). Because the communication traffic in such systems commonly travels many hundreds of kilometers, the need for add-drop multiplexing of individual channels is infrequent, occurring at widely-spaced add-drop nodes.

Although unidirectional WDM optical systems are suitable for conventional long-haul interexchange carrier markets, metropolitan (local) communications systems typically involve extensive routing and switching of traffic among various nodes positioned within optical fiber rings. Consequently, smaller metropolitan markets require considerably more extensive add-drop multiplexing in order to successfully implement wavelength division multiplexing in their short-range systems. Further, in order to maximize the effectiveness of wavelength division multiplexing in these local areas, it would be useful to implement bidirectional WDM optical systems, e.g., to enhance network design flexibility and minimize the number of optical fibers needed to implement work and protect systems. In a bidirectional WDM system counter-propagating WDM optical signals, each comprising a number of optical channels, are carried on the same waveguiding medium, such as a single optical fiber. Implementation of a bidirectional system requires several considerations not present in conventional unidirectional optical systems. Add-drop multiplexing in a bidirectional optical environment becomes considerably more complex since optical channels must be selected from each of the counter-propagating WDM optical signals. In addition to the difficulties posed by add-drop multiplexing channels from two counter-propagating WDM optical signals, there must also be techniques for directing optical service channels to various locations within the bidirectional network.

In U.S. Pat. No. 6,111,675, a system is disclosed for the bidirectional transmission of telemetry service signals using a single optical fiber. In a first configuration, one wavelength is used as a service channel in a first direction while a second wavelength is used as a service channel in a second direction. In a second configuration, termed a "walkie-talkie" technique, the same wavelength is used as a service channel in two directions. A complete telemetry service channel is launched in one direction followed by sending a complete service signal in the opposite direction; alternatively, the service signal messages are divided into segments which are alternately sent in two directions. While these techniques appear to have utility in long-haul optical systems, it would be useful to have a bidirectional wavelength division multiplexed optical communication system configured for systems requiring high volumes of optical add-drop multiplexing and which include a bidirectional optical service channel. Such a system could be advantageously employed in local, metropolitan networks.

SUMMARY OF THE INVENTION

The present invention provides a bidirectional wavelength division multiplexed optical communication system having bidirectional optical service channels. The bidirectional WDM optical communication system includes a bidirectional optical waveguide configured to carry a bidirectional optical communication signal comprising counterpropagating WDM optical signals. Each WDM optical signal includes plural optical channels and an optical service channel. A bidirectional optical add-drop multiplexer optically communicates with the waveguide. A first optical service channel selector optically communicates with the first bidirectional optical add-drop multiplexer input/output port. The first optical service channel selector is configured to separate the first optical service channel from the first WDM optical communication signal such that the first WDM signal enters the first input/output port of the bidirectional optical add-drop multiplexer and the first optical service channel is routed to a service channel module. Similarly, a second optical service channel selector optically communicates with the second input/output port of the bidirectional optical add-drop multiplexer. As with the first service channel selector, the second optical service channel selector separates the second optical service channel from the second wavelength division multiplexed optical communication signal such that the second wavelength division multiplexed optical communication signal enters the second input/output port of the bidirectional optical add-drop multiplexer and the second optical service channel is routed to the service channel module.

DETAILED DESCRIPTION

Figure 1:
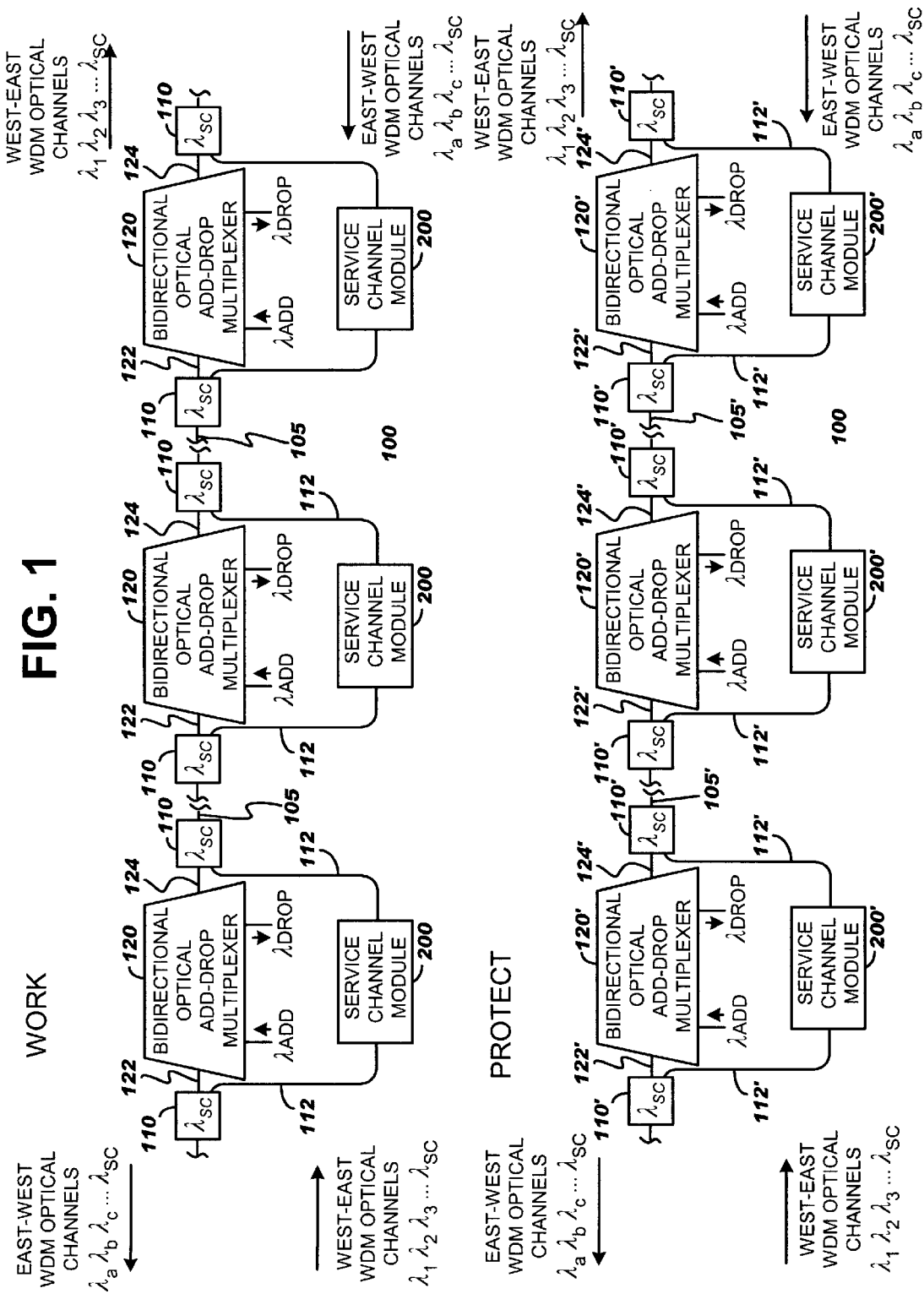
FIG. 1 schematically depicts a portion of a bidirectional wavelength division multiplexed optical communication system according to a first embodiment of the present invention.

Turning to the drawings in detail in which like numerals indicate the same or similar elements in each of the several views, FIG. 1 depicts a portion of a bidirectional optical network 100 according to a first embodiment of the present invention. As seen in FIG. 1, the bidirectional optical network includes bidirectional optical transmission wave guide 105. Bidirectional optical transmission waveguide 105 is configured to carry two counter-propagating wavelength division multiplexed optical communication signals, each WDM signal comprised of plural optical channels at different wavelengths. In accordance with traditional industry nomenclature, one of the WDM signals propagating in a first direction is designated the west-east WDM signal while the WDM signal propagating in the opposite direction is designated the east-west WDM signal. The individual optical channels in the west-east WDM optical signal are denoted by the symbols $\lambda_1$, $\lambda_2$, $\lambda_3$ etc., while the individual optical channels in the east-west WDM optical signal are denoted by the symbols $\lambda_a$, $\lambda_b$, $\lambda_c$, etc. for clarity of presentation. The optical service channels are represented by the symbol $\lambda_{SC}$.

As used herein, the expression "wavelength division multiplexed" or "WDM" refers to any optical system or signal composed of plural optical channels having different wavelengths, regardless of the number of channels in the system or signal. As such, the term "wavelength division multiplexing" or "WDM" encompasses all categories of WDM such as DWDM (dense wavelength division multiplexing) and CWDM (coarse wavelength division multiplexing).

Bidirectional optical waveguide 105 may be part of any type of optical network having at least one optical waveguide or a portion thereof which carries two counter-propagating WDM optical signals each including plural channels. Examples of network topologies in which the present invention may be employed include optical ring networks, optical mesh networks, point-to-point networks, subtended ring networks, or any other network topology which includes at least one bidirectional waveguide (or waveguide portion). As shown in FIG. 1, two bidirectional optical waveguides may optionally be provided, one for the "work" system and the other for the "protect" system. The work and protect systems are substantially similar; therefore, the element numbers for the protect system correspond to those for the work system with the inclusion of a ' following the element number.

Interposed along bidirectional optical waveguide 105 are optical add-drop multiplexers 120. Optical add-drop multiplexers 120 optically communicate with optical waveguide 105 such that at least one optical channel can be added and/or dropped from the bidirectional waveguide. As used herein, the expression "optically communicates" designates an optical path between two elements. The optical path may be a direct path or it may route through intermediate optical devices (e.g., optical isolators, additional optical circulators, filters, amplifiers, etc.). In an exemplary embodiment, optical add-drop multiplexer 120 is a bidirectional optical add-drop multiplexer, discussed in further detail in connection with FIG. 4 below and described in assignee's copending U.S. patent application Ser. No. 09/677,764, the disclosure of which is incorporated by reference herein.

For metropolitan applications, optical channels continually originate and/or terminate at optical add/drop multiplexer nodes, particularly in optical ring network configurations. Therefore, as schematically depicted in FIG. 1, there is not a launch or termination node comparable to those in conventional, point-to-point WDM optical systems.

Optical add-drop multiplexer 120 includes a first input/output port 122 and a second input/output port 124, each optically communicating with bidirectional waveguide 105. Positioned at each input/output port 122, 124 are optical service channel selectors 110. Optical service channel selectors 110 are configured to add-drop an optical service channel of a particular wavelength. In an exemplary embodiment, the optical service channel is selected in accordance with the ITU (International Telecommunications Union) standard of 1510 nm, plus or minus 10 nm. However, it is understood that any optical wavelength, including optical wavelengths either within or outside the gain band of a selected optical amplifier (such as an erbium-doped fiber amplifier), may be used for the bidirectional optical service channels of the present invention.

Optical service channel selectors 110 may be selected from any optical device capable of removing/inserting an optical channel from/to bidirectional optical waveguide 105. Exemplary optical devices for use as service channel selector 110 include multilayer optical interference filters (commercially available from FDK), 3-port optical circulators coupled with Bragg gratings reflecting the service channel wavelength (commercially available from JDS Uniphase), and wavesplitters (e.g., 5% optical taps combined with multilayer interference filters). Further description of such optical devices is found in *Optical Networks: A Practical Perspective,* incorporated by reference above. The selected optical service channel is output onto optical path 112 (typically an optical fiber) for routing to optical service channel module 200. Optical paths 112 also carry optical service channels to be added to bidirectional optical waveguide 105 from service channel module 200.

Figure 2:
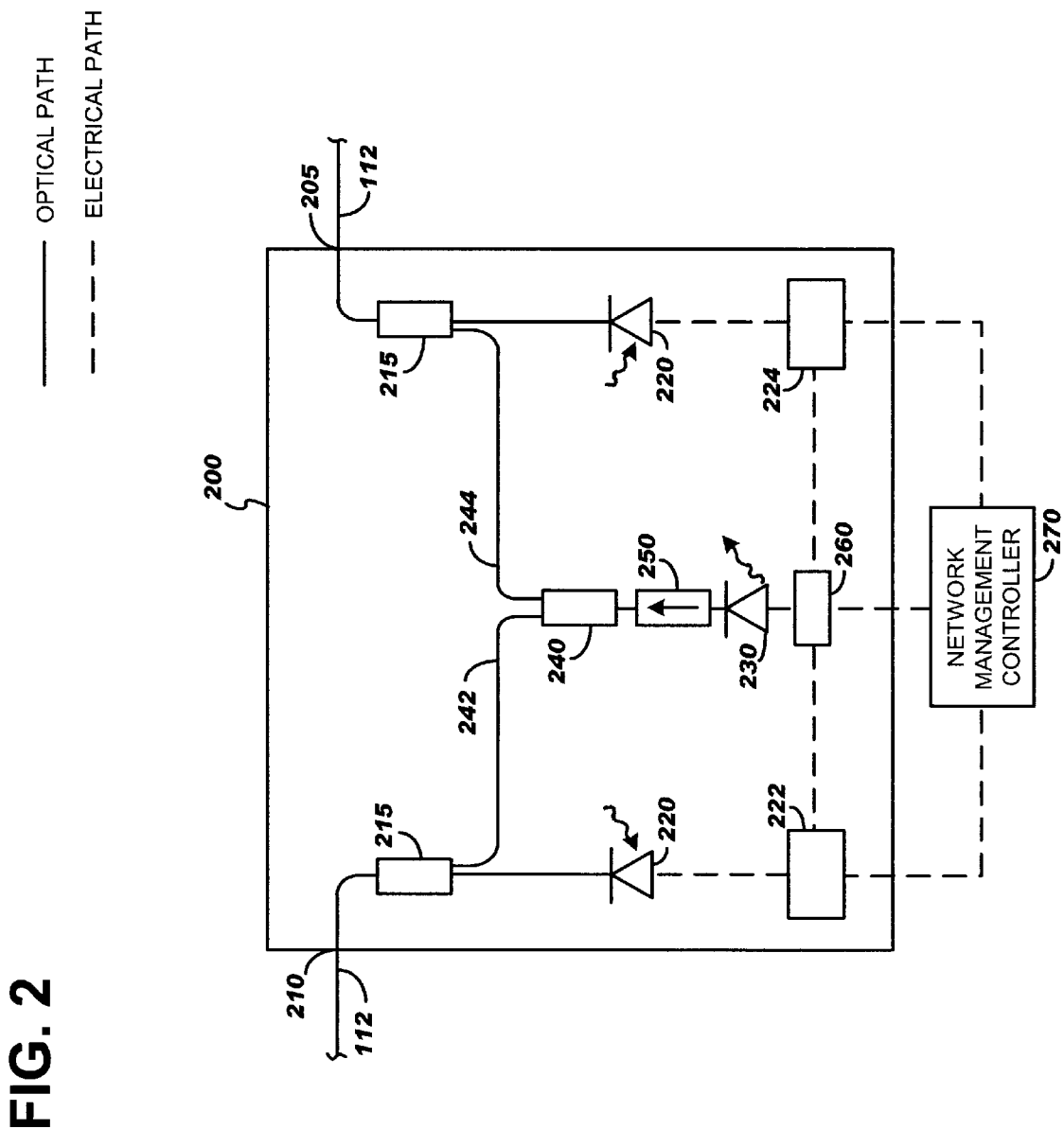
FIG. 2 schematically depicts a service channel module according to one embodiment of the present invention.

A first embodiment of optical service channel module is depicted in FIG. 2. A service channel propagating in the west-east direction enters service channel module 200 through service channel module input/output port 210; similarly, a service channel propagating in the east-west direction enters service channel module 200 through input/output port 205. Each selected optical service channel respectively enters an optical coupler 215 where it is passed to an optical detector 220. Optical detector 220 is schematically depicted as a photodiode; however it is understood that any device which converts an optical signal to an electrical signal is contemplated for use in the service channel module of the present invention. It is also noted that, although optical service channel module is depicted as a single unit, portions of the optical service channel module may be separated into plural modules; for this reason, the expression "service channel module" as used herein also includes such embodiments. Further, the service channel module may be part of a larger module which includes additional optical network functions.

An optical service channel is generated by optical service channel generator 230 using information from optical detectors 220 via receivers 222 and 224. Although schematically depicted as a laser diode (which may be either directly or externally modulated, e.g., via Mach-Zehnder or electroabsorption modulators), any optical generator which can produce an optical signal capable of carrying system information may be employed for creating the optical service channels of the present invention. When a directly-modulated laser is selected as the optical service channel generator, a laser driver 260 supplies current to laser 230 in accordance with the information supplied by receivers 222 and 224. Additional information may be placed onto the optical service channel via a network management controller 270. Similarly, network management controller 270 may receive information from the incident optical service channels. In this manner, information about other optical nodes in the system is shared throughout the entire system such that intelligent optical signal routing decisions can be made by the network management controller. Information including, but not limited to, optical signal power levels, add-drop multiplexer status and change orders (in the case of tunable optical channel selectors), system noise levels, temperature conditions, number of channels along a particular span, measured channel wavelengths, laser current level, transponder power levels, electrical switch status, optical switch status, signal power levels pre- and post-optical amplification, laser launch powers, etc. may be monitored and controlled by the network management controller (in connection with other network management controllers at other optical nodes) via the bidirectional optical service channels. When an eternally-modulated laser is used to generate the optical service channels, this information would be routed to an external modulator positioned downstream of the laser output.

The optical service channel enters optical coupler 240 where it is split into two optical signals which propagate on optical paths 242 and 244, through optical couplers 215 and through ports 210 and 205 onto optical paths 112. From there, the optical service channels will be placed onto the bidirectional optical waveguide via optical service channel selectors 110. Optionally, an optical isolator 250 may be interposed along an optical path adjacent optical coupler 240 in order to prevent optical signals from entering optical service channel generator 230.

Figure 3:
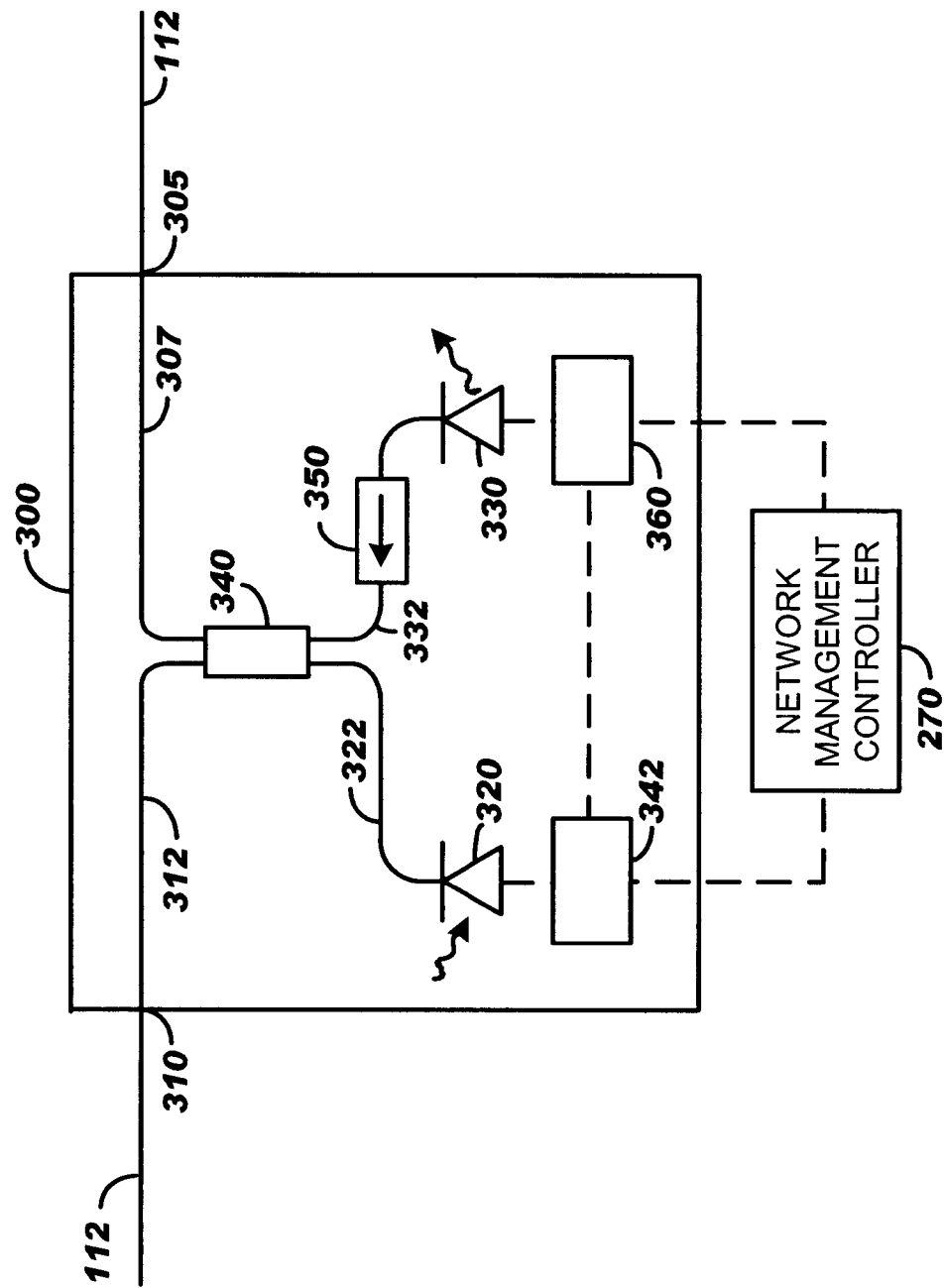
FIG. 3 schematically depicts a service channel module according to a further embodiment of the present invention.

FIG. 3 depicts an alternate embodiment for a service channel module, labeled as service channel module 300 (positioned at the same location as service channel module 200 in the bidirectional network of FIG. 1). In this embodiment, the optical service channels enter the module through input/output ports 310 and 305 and are respectively placed onto optical paths 312 and 307. The optical paths are combined in optical combiner 340 and routed to optical service channel receiver 320 via optical path 322. Information on each service channel is encoded such that the east-west service channel does not interfere with the west-east service channel. Through synchronization, the information on each channel can be retrieved through the use of a single optical service channel receiver, a significant cost saving.

The optical service channels are combined through optical coupler 340 and placed onto optical path 322 (being blocked from traversing along optical path 332 by optical isolator 350) where they enter optical detector 320. Electrical signals containing the information from the optical service channels in sent to transceiver 342. As in the previous embodiment, the transceiver may send information from the service channel to network management controller 270. The transceiver also sends information to laser driver 360, along with network management controller 270 in order to create the information to be placed on the optical service channels. As in the previous embodiment, when an externally modulated laser is employed, the information from the transceiver and the network management controller would be fed to an external modulator positioned after the laser (not shown).

Figure 4:
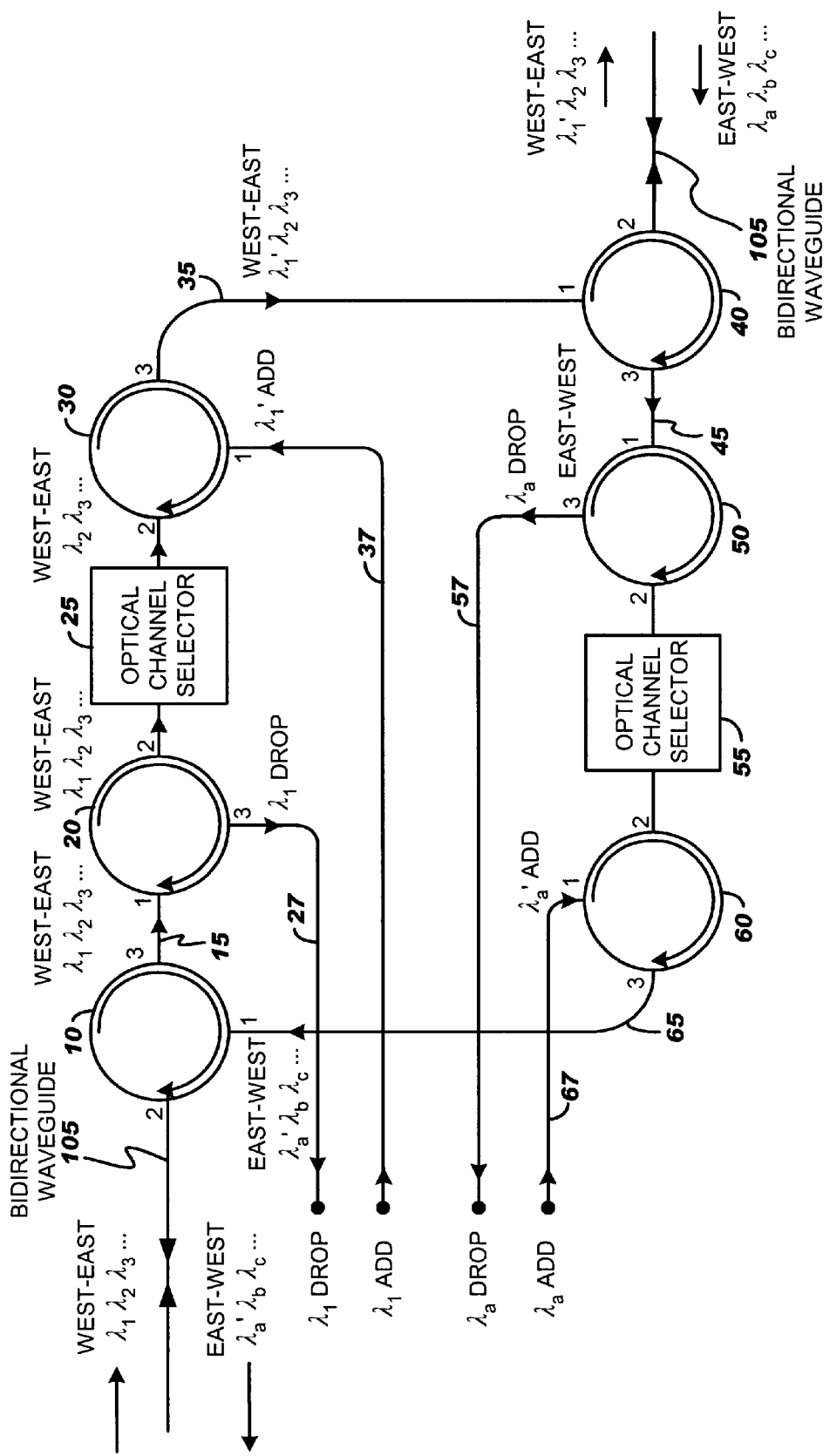
FIG. 4 depicts a bidirectional optical add-drop multiplexer which maybe used with the bidirectional optical network of the present invention.

Turning to FIG. 4, an exemplary bidirectional optical add-drop multiplexer that may be deployed in the bidirectional optical systems of the present invention is depicted. In bidirectional optical add-drop multiplexer 120, the west-east WDM optical signal enters optical port 1 of circulator 10 where it is output to optical path 15. Optical path 15 optically communicates with the first optical port of circulator 20 such that the west-east WDM optical signal enters the first port of the second circulator. Upon entering the first port of circulator 20, the west-east optical signals are transferred to output port 2. Output port 2 of circulator 20 optically communicates with optical channel selector 25. Upon encountering optical selector 25, one or more channels to be dropped from the west-east WDM signal are selected and routed back towards the second optical port of circulator 20. The remaining optical channels of the west-east WDM signal, i.e., the "through" channels $\lambda_2$, $\lambda_3$. . . , are routed towards first optical port of circulator 30. In the example depicted in FIG. 1, channel $\lambda_1$ is selected by channel selector 25 and routed back through optical port 2 where it is "dropped" at optical port 3 of circulator 20 onto optical path 27. From there, the selected optical channel may be routed directly to a receiver or it may be directed to another bidirectional (or unidirectional) optical system (e.g., an optical ring network serving a different geographical region). In this manner, individual optical channels may be leased/contracted to individual customers for exclusive use by that customer.

As the through optical channels are routed towards circulator 30, they enter the first optical port and exit through the second optical port onto output path 35. If it is desired to add one or more optical channels to the west-east WDM optical signal, the "add" channels are input via optical path 37 to the third optical circulator. The added channels are output through optical port 1 of circulator 30 where they are re-routed by optical channel selector 25 back through port 1 of circulator 30, exiting through port 2 onto optical path 35 along with "through" optical channels of the west-east WDM optical signal. The add channels may be produced by a local optical transmitter or they may be channels that have been routed to the bidirectional add-drop multiplexer from another optical system or from another segment of the same bidirectional optical system.

As recognized by those of ordinary skill in the optical communication systems art, optical circulator 30 can be easily replaced by a standard optical coupler, in which case the added optical channels would not interact with optical channel selector 25 but would be directly added to the through optical channels.

Optical channel selector 25 may be selected from any static or reconfigurable optical device which is capable of separating or otherwise routing one or more optical wavelengths from a wavelength division multiplexed optical signal. Such devices include, but are not limited to, Bragg gratings, tunable Bragg gratings, Fabry-Perot filters, acousto-optic tunable filters, multilayer dielectric thin film filters, arrayed waveguide gratings (AWGs) and/or combinations of these devices. Detailed descriptions of such optical selection devices are found in chapter 3 of *Optical Networks: A Practical Perspective*, incorporated by reference above.

In an exemplary embodiment, optical channel selector 25 comprises a chirped Bragg grating, i.e., a grating having a distribution of refractive index perturbations whose period varies along the axis of propagation. When a chirped grating is used in channel selector 25, the dropped optical channel is given a positive or negative chirp in the process of being diffracted by the grating, while the added optical channel is given a complementary negative or positive chirp, respectively, in the process of being diffracted by the same grating in the opposite direction. A positive chirp may be introduced in the added channel to reduce nonlinear interactions as the optical channel is transported along the bidirectional optical waveguide 5. This chirp is removed when the optical channel is diffracted by a chirped grating in the next drop operation; this "pre-chirp" /"de-chirp" procedure does not affect the detected signal nor interfere with any dispersion compensation techniques that may be employed in the bidirectional add-drop multiplexer or in other parts of the bidirectional WDM optical system.

Note that channel selector 25 need not be symmetrical, i.e., it need not drop the same number of channels or the same channel wavelengths. For example, the channel selector may comprise two or more tunable Bragg gratings optionally separated by an isolator. Each of the tunable gratings may be tuned to the same or different wavelength, corresponding to the channels to be dropped and added. As long as neither tunable grating is tuned to a wavelength of one of the through channels, such an asymmetrical channel selector may be easily created allowing for dynamically reconfigurable channel selection.

As the west-east through channels and the added channels exit the third circulator onto optical path 35, they are directed towards the third optical port of the fourth optical circulator, circulator 40. As seen in FIG. 4, optical port 1 of circulator 40 forms one of the two ports directly communicating with bidirectional optical transmission waveguide 5 in which the bidirectional add-drop multiplexer has been interposed (with port 1 of first circulator 10 being the other directly-communicating port). The west-east WDM optical signal, now including the added channels, continues in the same direction of propagation along bidirectional transmission waveguide as it is output through the first port of circulator 40.

As the west-east WDM signal exits the bidirectional add-drop multiplexer 120 through circulator 40 port 1, the east-west WDM optical signal simultaneously enters the bidirectional multiplexer 120 through the same port. The east-west WDM optical signal is output onto optical path 45, positioned between optical circulators 40 and 50. The east-west WDM signal enters the first port of circulator 50 where it exits port 2 towards optical channel selector 55. Optical channel selector 55 is substantially similar to selector 25 in that it may be comprised of the optical elements set forth above. Of course, optical channel selector 55 is configured to interact with the wavelengths of the east-west WDM signal, rather that the west-east wavelengths of channel selector 25.

As with the west-east WDM optical signal, upon encountering optical selector 55, one or more channels to be dropped from the east-west WDM signal are selected and routed back towards the second optical port of circulator 50. The remaining optical channels of the east-west WDM signal, i.e., the "through" channels $\lambda_b$, $\lambda_c$ . . . , are routed towards first optical port of circulator 60. In the example depicted in FIG. 4, channel $\lambda_a$ is selected by channel selector 55 and routed back through optical port 2 where it is "dropped" at optical port 3 of circulator 50 onto optical path 57.

As the through optical channels are routed towards circulator 60, they enter the first optical port and exit through the second optical port onto output path 65. If it is desired to add one or more optical channels to the east-west WDM optical signal, the "add" channels are input via optical path 67 to the sixth optical circulator 60. The added channels are output through optical port 1 of circulator 60 where they are re-routed by optical channel selector 55 back through port 1 of circulator 60, exiting through port 2 onto optical path 65 along with "through" optical channels of the east-west WDM optical signal. As with the west-east channels added and dropped, the added or dropped east-west channels may originate or terminate at local or remote locations.

Completing the optical path towards the bidirectional optical waveguide 105, the east-west optical WDM signal, along with the added optical channels, are input to the third optical port of the first optical circulator 10, where they rejoin bidirectional waveguide 105. The east-west WDM optical signal is continually output to bidirectional optical waveguide 105 through port 1 of the first circulator as the west-east WDM optical signal is contiually input to the bidirectional add-drop multiplexer through port 1 of the first circulator.

Optionally, the bidirectional optical add-drop multiplexer may include optical amplifiers in each of the west-east and east-west multiplexer branches. Depending upon the selected channel plan for the overall optical network, such optical amplifiers may be customized for optimal gain flatness in the wavelength region of the selected channels. For example, if the west-east WDM signal includes only optical channels within the C-band (nominally defined as wavelengths from approximately 1530–1565 nm), then the west-east optical amplifier would be optimized to provide as flat a gain profile as possible across those wavelengths. Conversely, if the east-west WDM signal includes only optical channels within the L band (nominally defined as wavelengths from approximately 1565–1610 nm), then the east-west optical amplifier would be optimized to provide an adequately flat gain profile across those wavelengths.

Alternatively, the west-east channels may be selected from wavelengths across the entire wavelength spectrum to provide maximum interchannel spacing distance (and minimize potential cross talk. In such an embodiment, the east-west channel wavelengths would alternate with the west-east channel wavelengths in an interleaved manner (e.g., west-east channel wavelengths of 1528, 1532, 1536, 1540, etc. and east-west channel wavelengths of 1530, 1534, 1538, 1542, etc.). In this channel plan, amplifiers with reasonably flat gain profiles, such as semiconductor optical amplifiers, may be selected. In either case, the west-east and east-west channels plans will likely be dictated by overall system considerations, such as the network topology in which the bidirectional optical add drop multiplexer will be deployed. Further, because the west-east and east-west WDM optical signals are routed along different paths within the add-drop multiplexers, it is possible that one or more of the optical channel wavelengths in each of the counter-propagating WDM signals may be the same.

Various dispersion compensation techniques may also be employed in the bidirectional add-drop multiplexers of the present invention. For example, an additional circulator port may be positioned between the first and second ports of circulators 10 and 40. An output path including a chirped grating may be placed in communication with this added port such the all of the west-east or east-west channels are reflected back through the added port. As they are reflected back by the chirped grating, a chirp is applied to compensate for transmission-induced signal dispersion. Alternatively, an additional three-port circulator having a second port with a chirped grating in its output path maybe positioned between circulators 10 and 20 or between circulators 40 and 50 to accomplish the same dispersion-compensating effect.

While the above invention has been described with reference to the particular exemplary embodiments, many modifications and functionally equivalent elements may be substituted without departing from the spirit and contributions of the present invention. Accordingly, modifications and functionally equivalent elements such as those suggested above, but not limited thereto, are considered to be within the scope of the following claims.

What is claimed is:

1. A bidirectional wavelength division multiplexed optical communication system having bidirectional optical service channels, the bidirectional wavelength division multiplexed optical communication system comprising:

a bidirectional optical waveguide configured to carry a bidirectional optical communication signal comprising a first wavelength division multiplexed optical communication signal comprised of a plurality of first optical channels and a first optical service channel propagating in a first direction and further comprising a second wavelength division multiplexed optical communication signal comprised of a plurality of second optical channels and a second optical service channel propagating in a second direction;

a bidirectional optical add-drop multiplexer optically communicating with the bidirectional optical waveguide, the bidirectional optical add-drop multiplexer having at least first and second input/output ports optically communicating with the bidirectional optical waveguide, the bidirectional optical add-drop multiplexer being configured to add and/or drop one or more optical channels from the plurality of first optical channels of the first wavelength division multiplexed optical communication signal while permitting remaining first optical channels to pass through the bidirectional add-drop multiplexer and being configured to add and/or drop one or more optical channels from the second wavelength division multiplexed optical communication signal while permitting remaining second optical channels to pass through the bidirectional add-drop multiplexer;

a first optical service channel selector optically communicating with the first input/output port of the bidirectional optical add-drop multiplexer, the first optical service channel selector configured to separate the first optical service channel from the first wavelength division multiplexed optical communication signal such that the first wavelength division multiplexed optical communication signal enters the first input/output port of the bidirectional optical add-drop multiplexer and the first optical service channel is routed to a service channel module;

a second optical service channel selector optically communicating with the second input/output port of the bidirectional optical add-drop multiplexer, the second optical service channel selector configured to separate the second optical service channel from the second wavelength division multiplexed optical communication signal such that the second wavelength division multiplexed optical communication signal enters the second input/output port of the bidirectional optical add-drop multiplexer and the second optical service channel is routed to the service channel module;

wherein the service channel module includes an optical service channel generator coupled to an optical coupler, the optical coupler having at least first and second outputs, the first output optically communicating with the first optical service channel selector and the second output optically communicating with the second optical service channel selector such that the optical service channel generator launches the optical service channel in each direction on the bidirectional optical waveguide.

2. A bidirectional wavelength division multiplexed optical communication system having bidirectional optical service channels as recited in claim 1 wherein the optical service channel selector includes a Bragg grating.

3. A bidirectional wavelength division multiplexed optical communication system having bidirectional optical service channels as recited in claim 1 wherein the optical service channel selector includes a multilayer optical interference filter.

4. A bidirectional wavelength division multiplexed optical communication system having bidirectional optical service channels as recited in claim 1 wherein the service channel module includes at least one optical detector and at least one optical service channel generator.

5. A bidirectional wavelength division multiplexed optical communication system having bidirectional optical service channels as recited in claim 1 further comprising a network management controller for receiving information from an optical service channel and for supplying information to an optical service channel.

* * * * *